United States Patent
Lu et al.

(10) Patent No.: US 8,365,243 B1
(45) Date of Patent: Jan. 29, 2013

(54) IMAGE LEAK PREVENTION USING GEOTAGGING

(75) Inventors: Minggang Lu, Nanjing (CN); Pei Zhang, Nanjing (CN); Jing Li, Nanjing (CN); Wen Zhu, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 172 days.

(21) Appl. No.: 12/835,763

(22) Filed: Jul. 14, 2010

(51) Int. Cl.
*G06F 21/00* (2006.01)

(52) U.S. Cl. ............... 726/1; 380/287; 726/26; 455/436; 382/100

(58) Field of Classification Search ........................ None
See application file for complete search history.

(56) References Cited

U.S. PATENT DOCUMENTS

| | | | |
|---|---|---|---|
| 7,616,777 B2 * | 11/2009 | Rodriguez et al. | 382/100 |
| 2010/0162347 A1 * | 6/2010 | Barile | 726/1 |

* cited by examiner

*Primary Examiner* — Fikremariam A Yalew
(74) *Attorney, Agent, or Firm* — Beyer Law Group LLP (57) ABSTRACT

Prevention of sensitive images such as photographs and video clips from being leaked from an organization uses geo-tagging metadata. A mobile computing device includes a software agent that implements a data loss prevention policy and a database of sensitive geographic areas defined by latitude and longitude coordinates. When an image is attempted to be stored on the device (or sent, received, renamed, copied, etc.) a software hook module detects the operation and obtains the geo-tagging metadata from the image for the agent. The agent compares the metadata of the image with each sensitive area found in its database to determine if the image was taken at a location within a sensitive area. If not, the operation is allowed, if so, the operation may be blocked, restricted or a warning may be sent to the user of the device or to another computer within the organization.

23 Claims, 5 Drawing Sheets

IMAGE LEAK PREVENTION USING GEOTAGGING

FIELD OF THE INVENTION

The present invention relates generally to data loss prevention. More specifically, the present invention relates to data loss prevention of images from mobile devices.

BACKGROUND OF THE INVENTION

Information within organizations and entities is often classified as sensitive either for business reasons or for legal reasons. This information may reside within documents, drawings, machinery, layout, use of equipment, text files, databases, images, pictures, etc. In addition to the potential threat of an unscrupulous party illegally accessing the organization from the outside via an electronic network, and then removing or disrupting the information, there exists the risk of intentional or inadvertent transmission of the sensitive information from inside the organization to the outside. For example, a disgruntled employee might send an image of a sensitive document to which he or she has access to an outside party via a mobile device, thus causing harm to the organization.

In addition to simple business reasons for not wanting sensitive information to be released, i.e., the desire to keep trade secrets secret, many new government regulations mandate controls over information (requiring the sensitive information not to be released outside the company) and companies must comply in view of significant penalties. For example, HIPAA regulates health information, BASEL II regulates financial information, Sarbanes-Oxley regulates corporate governance, and a large number of states have passed data privacy laws requiring organizations to notify consumers if their information is released. Companies are even subject to a regular information technology audit which they can fail if they do not employ suitable controls and standards.

Technology companies have reacted to this environment with a host of data loss prevention (DLP) products. These products are typically hardware/software platforms that monitor and prevent sensitive information from being leaked outside the company. These DLP products are also known as data leak prevention, information leak prevention, etc. Gateway-based DLP products are typically installed at the company's Internet network connection and analyze outgoing network traffic for unauthorized transmission of sensitive information. These products typically generate a unique signature of the sensitive information when stored within the company, and then look for these signatures as information passes out over the network boundary, searching for the signatures of the sensitive information. Host-based DLP products typically run on end-user workstations within the organization. These products can address internal as well as external release of information and can also control information flow between groups of users within an organization. These products can also monitor electronic mail and instant messaging communications and block them before they are sent.

But, sensitive information from within a company may be captured in the form of a picture, image or video, and then transmitted via a mobile device—making detection and prevention more difficult. For example, it may not be possible to apply a DLP policy to the captured image if an individual uses his or her own mobile device to take a picture. As mobile technology evolves, more and more mobile devices are equipped to take photographs and videos. Because of a mobile device's small size and high-quality imaging, unscrupulous individuals may use the mobile device to steal sensitive information. Corporations may establish a policy to prevent mobile devices with a camera capability from being brought into the corporation, but such a policy may not be easy to enforce. Another technique used is that some mobile device manufacturers require the device to produce a loud sound or flashing light when taking a picture. But, this feature can be disabled or could be circumvented by taking a video clip. Currently, there is no efficient and reliable technique for preventing the leakage of sensitive information through the use of a mobile device.

What is desired is an improved technique for preventing the loss of sensitive information through the use of mobile devices.

SUMMARY OF THE INVENTION

To achieve the foregoing, and in accordance with the purpose of the present invention, a data loss prevention technique is disclosed that combats data leakage of images, movies and videos from mobile devices.

The present invention provides a way to efficiently identify any picture or video taken in a sensitive area of a corporation where important documents, equipment or other trade secrets are stored. The technique reduces the possibility of sensitive data leakage through the taking of pictures or images, and controls the risk right at the source.

In a first embodiment of the invention, a method enables a mobile computing device to implement a data loss prevention (DLP) policy of an enterprise. An enterprise server computer receives geographical location coordinates that define a sensitive area; these may be input by user, transferred from a database, etc. These geographical location coordinates are stored in a sensitive area database of the server computer. Of course, more than one sensitive area of the enterprise may be defined in this way. Next, the geographical location coordinates are transferred from said server computer to a mobile computing device; the mobile device is under control of the enterprise. The enterprise server computer also receives a rule of a DLP policy; the rule requires an action to be taken when the location of an image falls inside said sensitive area. For example, storage or transfer of the image may be blocked. The rule of the DLP policy is then stored in a database of the server computer and then the rule is deployed from the server computer to the mobile computing device.

In a second embodiment of the invention, a method enforces a data loss prevention (DLP) policy of the enterprise on a mobile computing device. Software on the mobile device receives an indication that a triggering event has occurred; the triggering event includes an identification of an image present on the mobile device. A software module then retrieves geotagging metadata from the image, the metadata indicating the geographical location where the image was taken. Next, the module retrieves geographical location coordinates from a database of the mobile device, these coordinates defining a sensitive area. The module then determines whether the geographical location falls within the sensitive area. If so, then an action is taken with respect to the image. For example, the image may be blocked from being stored or from being transferred from the mobile device.

In a third embodiment of the invention, a method enforces data loss prevention (DLP) policy of the enterprise on a mobile computing device. A software hook module executes on the mobile device and intercepts execution of an operation of the mobile device. The operation includes an identification of an image present on the mobile device. A software module retrieves geo-tagging metadata from the image, this metadata indicating the geographical location where the image was taken. The module then retrieves geographical location coordinates from a database of the mobile device, the coordinates defining a sensitive area. It is then determined whether the geographical location falls within the sensitive area. If so, then the operation is blocked from occurring on the mobile device.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

An improved data leak loss technique is able to help prevent images and video from being leaked outside an organization. The technique utilizes geotagging technology to provide a simple solution to combat data leakage via images or videos.

As is known in the art, geotagging is the process of adding geographical identification metadata to various media such as photographs, images, video clips, Web sites or RSS feeds and is a form of geospatial metadata. This data usually consists of latitude and longitude coordinates, though it can also include altitude, bearing, accuracy data, and place names. It is used to tell users rather precisely the location of the content of a given picture or other media, and conversely, on some media platforms (such as Google Earth) it is used to show media relevant to a given location. Geotagging can help users find a wide variety of location-specific information. For instance, one can find images taken near a given location by entering latitude and longitude coordinates into a geotagging-enabled image search engine. Geotagging-enabled information services can also potentially be used to find location-based news, Web sites or other resources.

For photographs stored in the JPEG file format (for example), the geotagging information is typically embedded in the metadata, being stored either in the exchangeable image file format (EXIF) or in the extensible metadata platform (XMP) format. This metadata is not visible in the photograph itself but is read and written by special programs and most digital cameras and modern scanners. For example, geo-tagging information can be stored in any EXIF image file format, e.g., JPEG, TIFF (Tag Image File Format) or RIFF (Resource Interchange File Format).

As is known in the art, geographic location information comes from the global positioning system (GPS) which uses a latitude and longitude coordinate system. GPS coordinates may be represented in any number of ways. For example, latitude and longitude are typically represented in units of degrees with decimals, e.g., GPS Latitude: 57 deg 38' 56.83" N
GPS Longitude: 10 deg 24' 26.79" W
GPS Position: 57 deg 38' 56.83" N, 10 deg 24' 26.79" W The suffix for North, South, East or West may also be a prefix. In addition, latitude and longitude made to be expressed in decimal degrees using negative numbers for South and West (e.g., a position of 14.2293, −97.3982). Or, latitude and longitude may be expressed as degrees, minutes and seconds without the use of decimals. Preferably, a representation is used which allows for a precise determination not only of the sensitive area, but also of the location where the photograph is taken.

Currently, increasing numbers of mobile device vendors are embracing the geotagging technology, including mobile devices such as the Apple iPhone, the Google Android, the Nokia e71, the Sony Ericsson XPERIA X1, etc. The presence of geotagging technology may soon become a standard function for every mobile device with camera capability. The present invention capitalizes upon the use of geotagging technology to identify photographs, images or videos taken from within sensitive locations.

Geotagging Example

Figure 1:
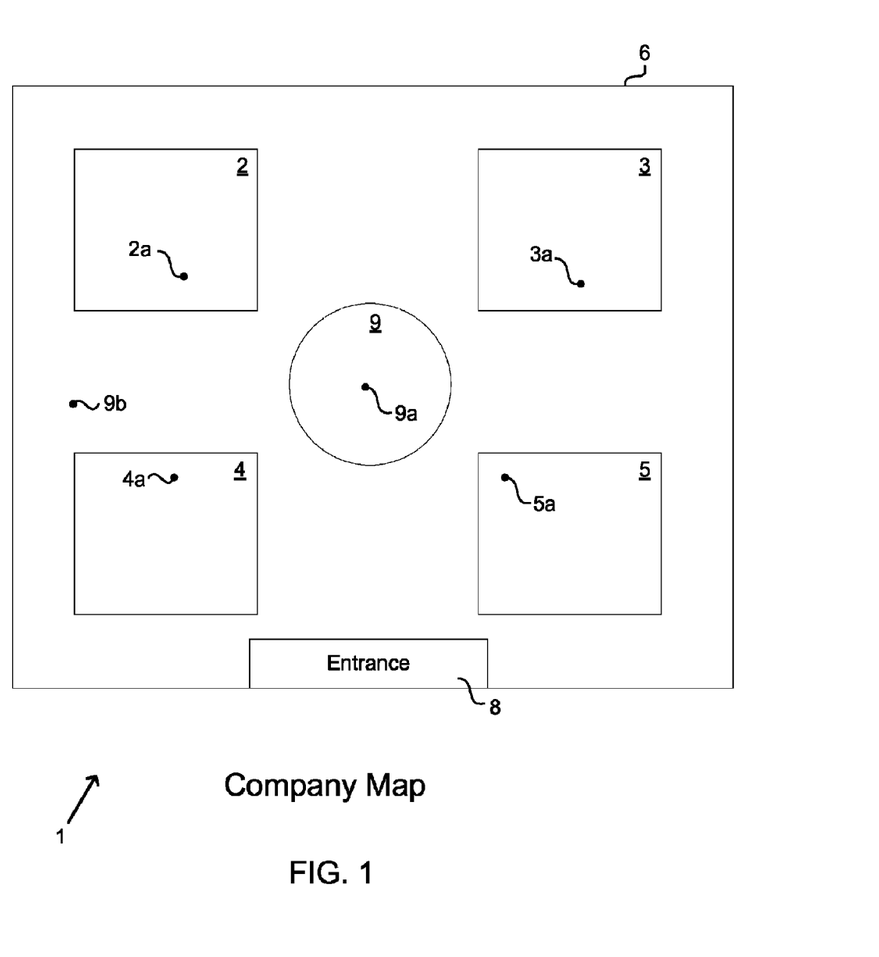
FIG. 1 illustrates a simple diagram of an aerial view for a particular company.

FIG. 1 illustrates a simple diagram 1 of an aerial view for a particular company. Shown is a geographical boundary 6 for the company (or other entity, enterprise, etc.), an entrance 8 and various sensitive geographical areas within the company such as areas 2, 3, 4, 5 and 9. Shown also are locations 9b, 2a, 3a, 4a and 5a indicating precise locations were a photograph or video was taken using a mobile device. Assuming that the geotagging metadata is appended to the photograph or video taken at these precise locations from within the company, the company may restrict this information using a particular DLP policy. For example, the company may define a policy that photographs or videos taken within sensitive areas 2 and 5 (such as at locations 2a and 5a) are not permitted to be sent to an entity outside the control of the corporation, that photographs or videos taken within sensitive areas 3 and 4 (such as at locations 3a and 4a) may be sent anywhere, and that photographs or videos taken anywhere else (such as at location 9b) are subject to review on a case-by-case basis.

The sensitive areas within any particular enterprise may be in any shape or form. While areas 2-5 are shown as rectangles, they may be in any shape defined by straight lines having any number of corners. In order to define such a sensitive area using geographical coordinates, the precise longitude and latitude of each corner is given, and from this the area may be determined. For example, sensitive area 2 may be defined by providing the latitude and longitude of each of its four corners. In another embodiment, a sensitive area may be defined by providing a radial distance from a central, sensitive point. For example, location 9a may be the location of a secret piece of equipment within the company (and its precise latitude and longitude are provided). Sensitive area 9 is then defined as being any location within a distance of 5 meters from geographical location 9a (thus forming a circular sensitive area).

In another embodiment, a rectangular sensitive area is defined as a range from a first latitude to second latitude, and a range from a first longitude to a second longitude. In another embodiment, a sensitive area may be defined as a particular region on a map (for example, the entire property of the company), and a photograph taken at particular coordinates may be compared to that region on the map to determine if the photograph falls within the sensitive area.

Other ways to define a sensitive area include defining a sensitive area according to a specific department in a corporation. The sensitive information is usually associated with a specific department in a corporation, e.g., the finance department or the R&D department. It is possible that there will be separate physical areas for these departments with specific functions. For example, corporation A has an R&D department in City B and City C. Our solution is able to define one DLP rule that enforces DLP policy with respect to all the photographs or videos taken from corporation A's Finance department. We can define the region using a polygon with several vertices. The vertices are identified using longitude and latitude, or a similar coordinate system.

Block Diagrams

Figure 2:
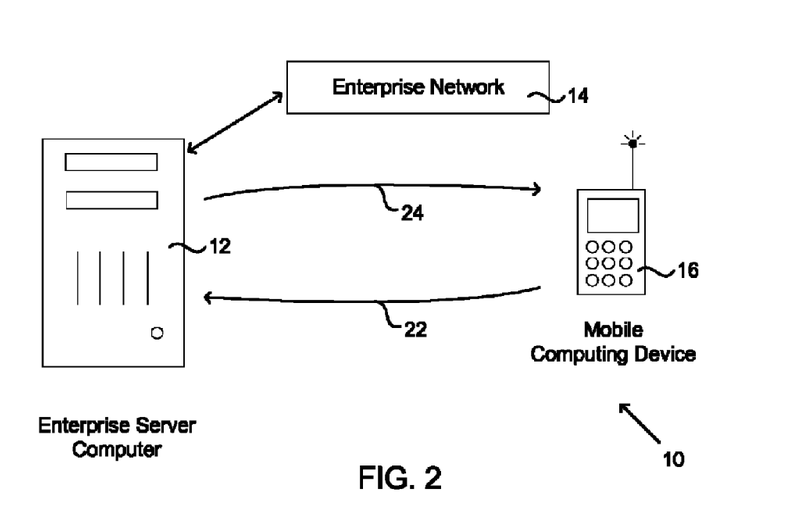
FIG. 2 illustrates an environment in which a mobile device is under control of an enterprise.

FIG. 2 illustrates an environment 10 in which a mobile device is under control of an enterprise. Shown is a server computer 12 of the enterprise, a mobile computing device 16 and communication links 22 and 24 between these hardware devices. Computer 12 is any suitable laptop, desktop or more powerful server computer that implements any suitable DLP software product that serves the entire enterprise. This product may be a standard product customized through the addition or modification of the modules 42, 44, 46, 52, 56 and 58 described below, or may be a custom product with the functionality described below. Of course, computer 12 communicates over an enterprise network 14 with the rest of the enterprise and may be in communication with any number of other server computers, end-user computers and other software products. As is known in the art, this server computer and the many end-user computers are all under control of the enterprise and subject to its DLP policy.

Also shown is a mobile device 16 such as a mobile telephone, smart phone, personal digital assistant, handheld navigation unit, portable music player, netbook computer, set-top box, multi-media player, camera, etc. In general, mobile device 16 is characterized in that it includes a camera or other imaging technology for taking photographs or video clips, as is known in the art. The mobile device also includes a GPS module (typically a GPS chip) and a geo-tagging module that obtains the geographical location information from the GPS module. In the context of the invention, device 16 and its user are subject to a DLP policy promulgated by the enterprise meaning that the device will implement this policy and may be required to block certain actions that the user attempts in order to prevent sensitive data from being leaked from the enterprise.

In the course of operation, server computer 12 sends information and data over a link 24 to the computing device and the computing device sends information and data back to the computer over link 22. Communication may occur directly with the server computer or via the enterprise network. Typically, these links are a single communication channel that may be wired or wireless. In a wireless environment, this communication channel may be a standard wireless telephone connection (e.g., cell phone service), a Wi-Fi connection, a Wi-Max connection, a wireless Internet connection, a Bluetooth protocol connection, an infrared connection, or any other suitable radio frequency connection used by the mobile device. In a wired environment, the mobile device may be connected to the server computer (or to another proxy computer downstream of the server computer, or to enterprise network 14) via an Ethernet cable (in the case of a netbook computer), via a docking device wired to the server computer (in the case of a mobile telephone), or via any other suitable wired connection protocol such as USB, etc.

Figure 3:
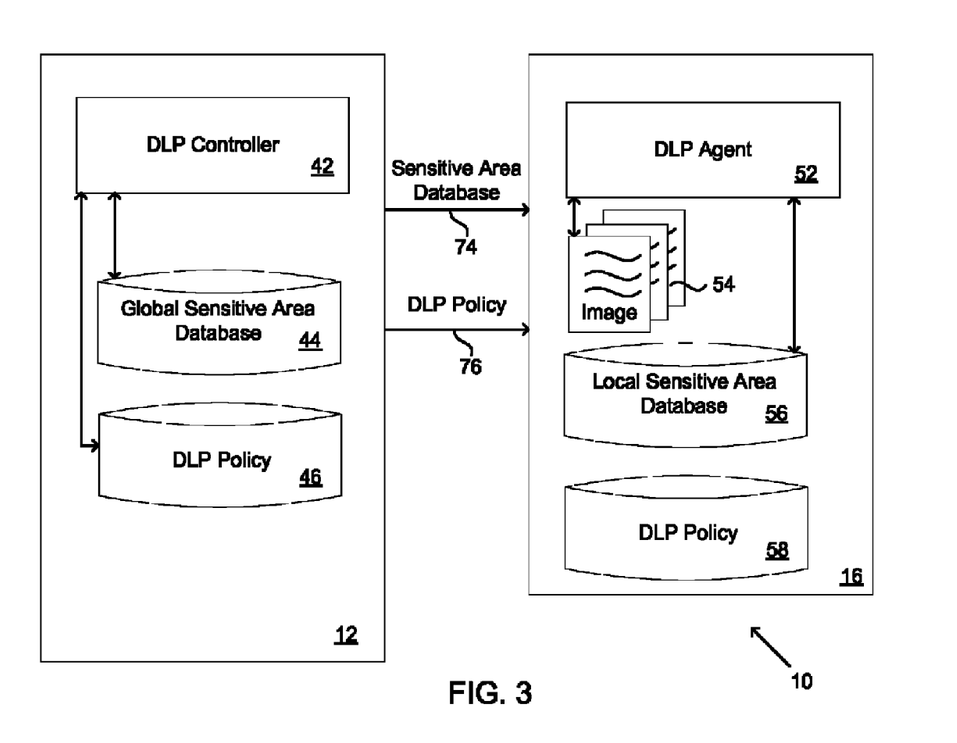
FIG. 3 illustrates another view of environment showing details of the server computer and the mobile device.

FIG. 3 illustrates another view of environment 10 showing details of the server computer and the mobile device. Server computer 12 includes (among other hardware and software) a DLP controller 42 whose functions are detailed below. Controller 42 may be written using any language, e.g., C, C++, assembly, etc. Mobile device 16 includes DLP software agent 52. Thus, the present invention thus utilizes a DLP software agent in the mobile device and a DLP software controller located at a fixed device, such as a desktop computer or computer server.

The role of the DLP agent is to perform the following functions: synchronize with the DLP controller on DLP policy and the sensitive area database; identify photographs or videos taken with the mobile device; obtain geo-tagging metadata for each photograph or video; audit and control local operations according to the DLP policy and geo-tagging metadata obtained; monitor receipt and transmission of photographs and videos having geo-tagging metadata; send the metadata to the DLP controller (if necessary); retrieve metadata judging results back from the DLP controller (if necessary). Likewise, the DLP controller performs the following functions: determine locations that are within a sensitive area and to which DLP policy to apply; and judge whether the geo-tagging metadata received from the mobile device are within sensitive areas or not, and send back the results (this function can also be done on the DLP Agent if the sensitive area database is pushed to agent).

This controller 42 may be embedded within a complete DLP product installed upon the enterprise server computer, or may be a module separate from the DLP product, where the actual DLP product is installed elsewhere. Also included, and in communication with the controller, is a database of DLP policy 46 that dictates how images located on mobile devices (or other enterprise devices) should be managed. For example, one rule of the policy may dictate that a sensitive image subject to the policy is any image present on the mobile device. Other rules may be defined with regard to photographs being taken in particular sensitive areas as defined above, e.g., any photograph taken in a sensitive area is determined to be a sensitive image subject to restrictions. The policy dictates in what circumstances a sensitive image on the mobile device (or other enterprise device) should be allowed to be stored, copied, transmitted, output, printed, sent, or otherwise taken outside of control of the mobile device or enterprise. For example, a DLP policy may include restrictions on sensitive images such as: the image may not be stored, copied, transferred, displayed, printed, transferred to removable storage of the mobile device (such as a memory card or USB key), sent as an attachment, uploaded, etc. Of course, a policy may include a single one of these restrictions, other restrictions, or any combination of these restrictions. Other examples of restrictions in a policy are: any GSM message including the sensitive image is forbidden to be sent, an e-mail message including a sensitive image is not permitted to be sent to unauthorized users, sensitive images are banned from being transferred to another mobile device using a wireless protocol such as infrared transmission or Bluetooth, etc. The local policy 58 may be stored within any suitable database or memory of the mobile device and may be implemented in suitable software, such as a rules database.

Sensitive images subject to the DLP policy may be further defined as being a photograph or video clip taken at a location that is within a sensitive area. To these ends, the DLP policy may define any number of geographic sensitive areas within the enterprise (such as areas 2-5 and 9). If an image or video clip includes a geo-tagging metadata indicating that the image or clip was taken within the sensitive area then the image or clip is defined as a sensitive image and is subject to any of the rules in the DLP policy. The enterprise may define different levels of sensitive areas each having different levels of restrictions. For example, images from area 2 may be allowed to be stored on the device but not sent, images from area 3 may be allowed to be sent only to other mobile devices under control of the enterprise, images from area 4 may never be stored on any device, while images from area 5 may only be sent to particular users. Also, images from area 9 may only be allowed to be sent to an e-mail address within the corporate domain. Further, areas 2-5 and 9 need not be mutually exclusive, that is, they may overlap. Also, a default policy may apply to images taken within the enterprise that do not fall within any of the sensitive areas. Sensitive areas need not be in any particular shape (such as the square areas as shown).

Other DLP policy rules that would apply to images taken with a mobile device include: the photo/video created in the sensitive area cannot be transferred via Bluetooth; the photo/video created in the sensitive area cannot be sent via SMS; the photo/video created in the sensitive area cannot be sent via e-mail; the photo/video created in the sensitive area cannot be copied or shared; and the photo's or video's EXIF information created in the sensitive area is forbidden to be modified.

Global sensitive area database 44 is a database containing definitions of sensitive areas. An organization may deem any area or location sensitive because it does not wish any photographs or video clips taken within that area to be transmitted outside the organization, to be transmitted outside a particular group of users, to be moved from a storage location, to be moved from a mobile computing device controlled by the organization, or simply wishes to track any images of that area when being transmitted, etc. An area may be marked as sensitive by determining coordinates that mark the boundaries of that area and then storing that data in database 44 accessible by controller 42. Database 44 may be implemented using an internal database of the DLP product or by using software such as MySQL, MS SQL Server, Oracle Database, or any other proprietary custom-built index system.

Depending upon the coordinates and scheme used to define a sensitive area, database 44 may contain different types of information. For example, considering sensitive area 9, database 44 will contain an entry consisting of precise latitude and longitude coordinates for the center of the sensitive area, along with a distance indicating the radius for such an area. For a rectangular sensitive area (or other area defined by lines and vertices), each entry in the database will consist of the precise latitude and longitude of each vertex of the area. For a sensitive area defined as a range, each entry for such an area will consist of two precise latitudes and two precise longitudes. For a sensitive area defined as a region on the map, the database entry will include a graphical depiction of that region on the map.

Examples of how a database would look with particular latitude and longitude coordinates include the following. Assume that there are 2 tables in the sensitive area database, Table 1 is responsible for department/sensitive area ID mapping, and Table 2 is responsible for sensitive area ID and latitude/longitude mapping. The following is one sample of the database.

TABLE 1

Department/Sensitive Area ID mapping

| Department | Sensitive_area_ID |
|---|---|
| Finance | 1 |
| R&D City A | 2 |
| R&D City B | 3 |

TABLE 2

Sensitive Area ID and Latitude/Longitude Mapping

| Sensitive_area_ID | Start_latitude | Start_longitude | End_latitude | End_longitude |
|---|---|---|---|---|
| 1 | 323.87\'0"N | 11847.48\'0"E | 330.65\'0"E | 11860.11\'0"E |
| 2 | 261.55\'0"N | 11637.44\'0"E | 280.12\'0"E | 11649.26\'0"E |
| 3 | 247.13\'0"N | 11354.97\'0"E | 250.32\'0"E | 11362.23\'0"E |

Turning now to a detailed view of mobile device 16, included is a DLP agent 52 having the functionality described above and in more detail below. Agent 52 is preferably written using the C or C++ computer language. Also included within the mobile device are any number of digital images 54. These images include photographs, video frames, video clips, etc., taken with a mobile device; an image may be in any suitable digital format such as JPEG, PNG, GIF, BMP, TIF/TIFF, MPEG, PSD, PCX, MSV, VOC, MP3, MIDI, etc. Other image formats such as ICO, WMF, TGA, FPX, SVG, CDR, UFO and EPS may also be used if modified to carry EXIF information (or similar) or GPS information that can be leveraged by the present invention.

In general, any image stored upon the mobile device may be subject to the DLP policy, and not necessarily images taken with current device. A local sensitive area database 56 is created and stored by the DLP agent on the mobile device and may also be implemented using SQLite software or other custom-built index system software. DLP policy 58 is the same as DLP policy 46 stored on the server computer 12, or may be a subset of that policy specifically tailored to mobile devices. As shown, the DLP agent is arranged to receive information from the global sensitive area database 44 via communication link 74 as will be described in greater detail below.

Flow Diagrams

Figure 4:
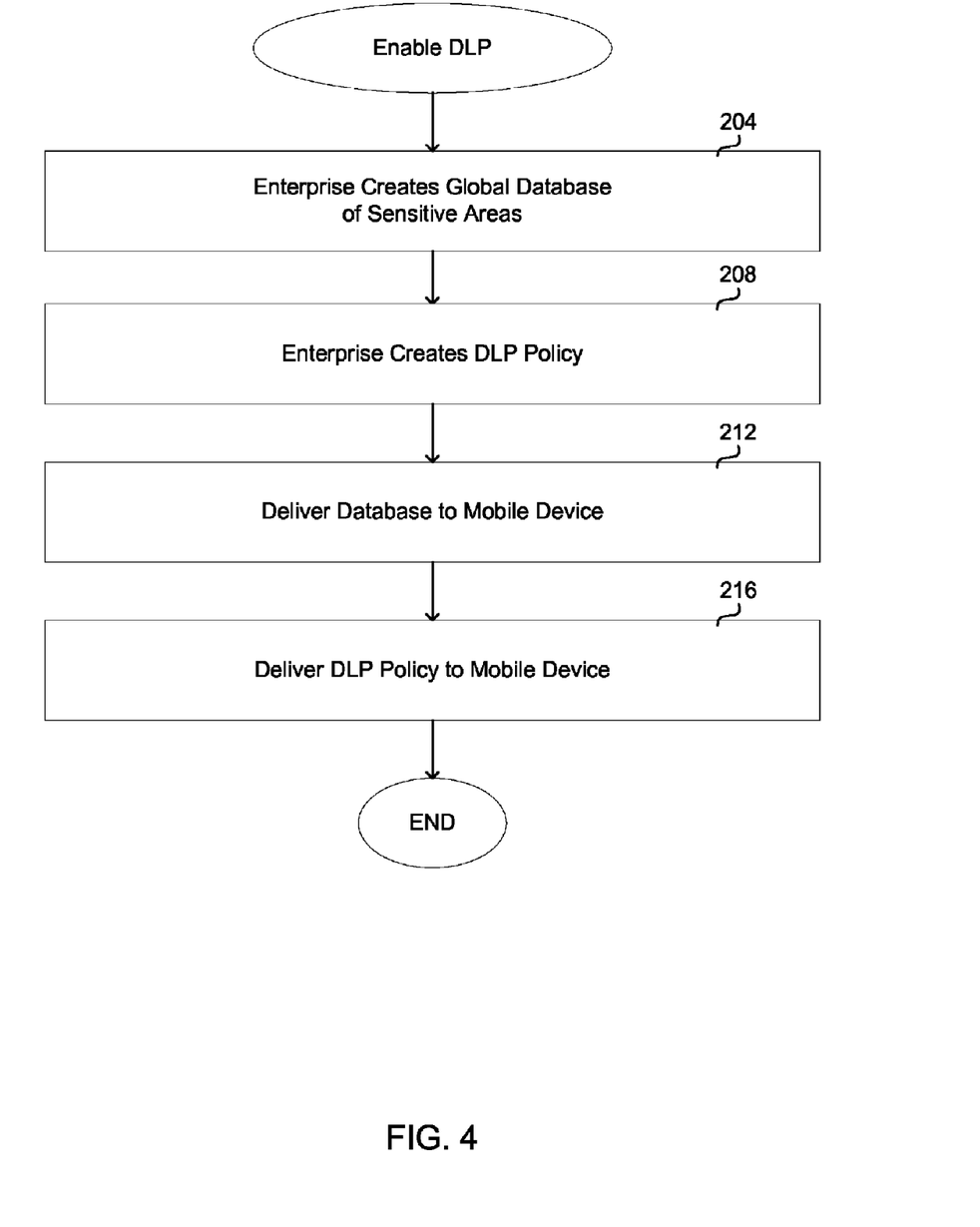
FIG. 4 is a flow diagram describing how the data loss prevention technique of the present invention is enabled.

FIG. 4 is a flow diagram describing how the data loss prevention technique of the present invention is enabled. In step 204 the enterprise identifies sensitive areas within the enterprise and stores the boundaries of these areas in global sensitive area database 44. The enterprise preferably identifies a priori which areas are sensitive and should be stored in the database. This technique may be performed using the coordinate schemes and embodiments of sensitive areas explained above.

In step 208 a suitable DLP policy 46 (such as the examples given above) is created by the enterprise and stored in database 46. At a suitable time, in step 212 the database 44 (or a subset thereof) is delivered to each mobile device that is connected to the enterprise network. For example, each time the mobile device joins the network the mobile device retrieves the sensitive area database 44 from enterprise (or retrieves a subset). Or, the enterprise periodically pushes the database 44 to all mobile devices currently connected to the network. Additionally, when the sensitive area database contents have been changed (such as added, deleted or updated) the sensitive area information stored in the database may also be transmitted to the mobile device.

At a suitable time, in step 216 policy 46 is delivered to each mobile device that is connected to the enterprise network. For example, each time the mobile device joins the network the mobile device retrieves the current policy from enterprise. Or, the enterprise periodically pushes the policy 46 to all mobile devices currently connected to the network. Also, when the DLP policy for sensitive area changes, the sensitive area database and the DLP rules for sensitive area will be transmitted to the mobile device. At this point, the mobile device 16 is enabled to begin enforcing the DLP policy.

Figure 5:
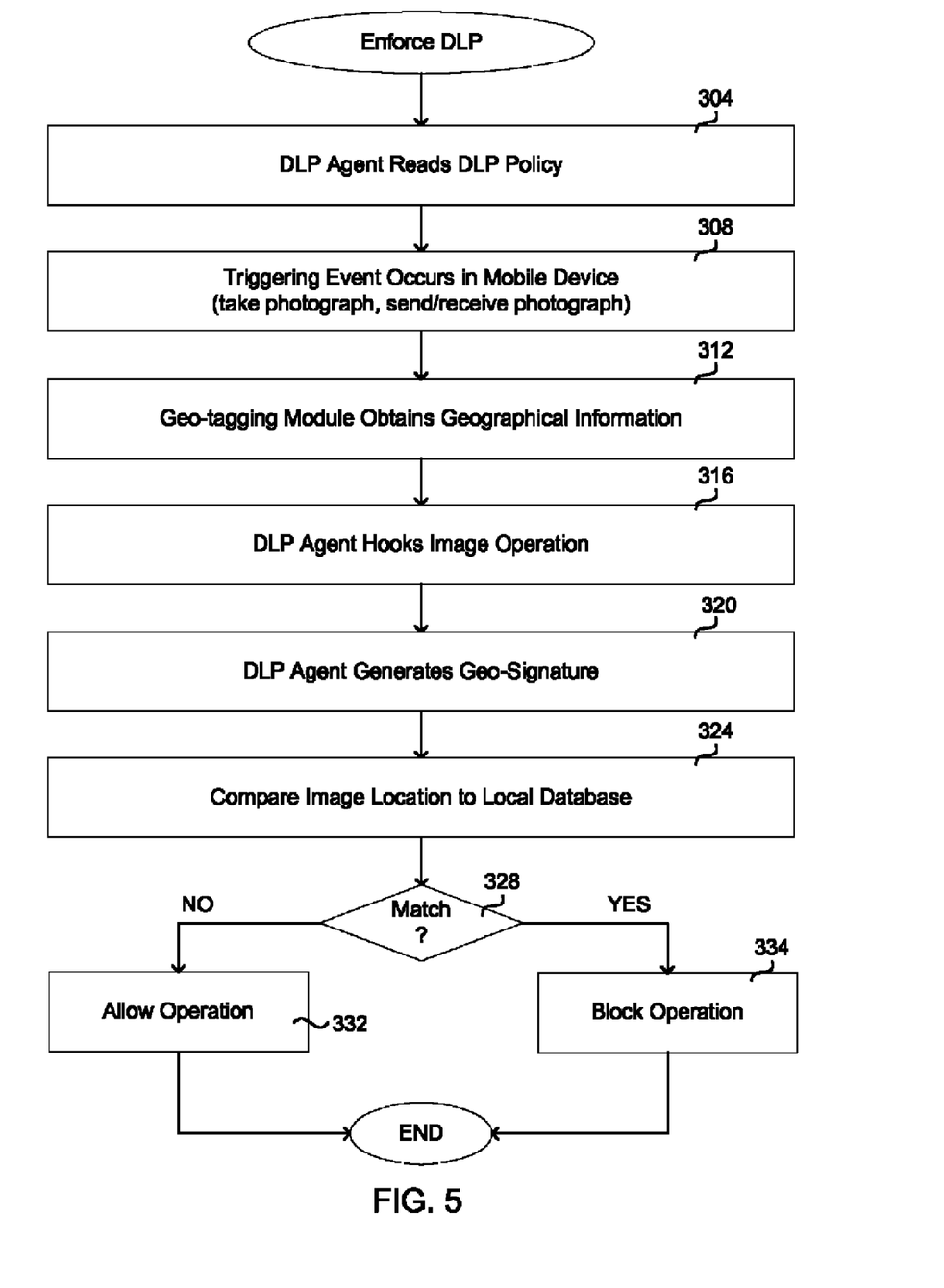
FIG. 5 is a flow diagram describing how a policy is enforced upon a mobile device.

FIG. 5 is a flow diagram describing how a policy is enforced upon a mobile device. At step 304 the DLP agent reads the current policy 58 and local sensitive area database 56 into a memory of the mobile device in order to prepare for screening of images that may be taken from, sent from, or received at the device.

In step 308 a triggering event occurs signaling that the mobile device is attempting to perform an operation on an image. For example, the user may be attempting to take a photograph or video clip with the mobile device, to attach an image to an outgoing e-mail or MMS message, to upload an image over an Internet connection, to copy an image, to rename an image, to transfer an image to a removable storage device of the mobile device (such as to a SIM card, flash memory or USB key), to receive an image at the mobile device from another computing device, etc. Any of these operations may result in, or be an indication of, an image being transferred out of the control of the enterprise.

In a situation in which the user is taking a photograph or recording a video clip with the mobile device, a geo-tagging module of the mobile device will obtain geographical location information in step 312. As is known in the art, the mobile device includes a geo-tagging module that will automatically obtain and insert location coordinates into the photograph or video clip. In one embodiment, the geo-tagging module uses a GPS embedded within the mobile device to obtain the location coordinates.

For the other triggering events, step 312 is optional because the geo-tagging module will not attempt to obtain location information because a new photo him and graph or video clip is not being taken. Rather, the image that is being received, that is being sent, that is being transferred, etc., will already include the location coordinates (the geo-tagging metadata) within the image as described above.

In step 316 the DLP agent uses a software hook module to hook the image operation that has caused the triggering event to occur. As is known in the art, the mobile device will call certain application programming interfaces (APIs) of its operating system in order to perform an operation on the image such as storing a photograph, sending an image via e-mail, attaching an image to a message, renaming an image, copying an image, receiving a message with an image attachments, etc. A software hook is used to hook each of these APIs that are of interest in order to obtain the geo-tagging metadata of the image and then to compare that specific location against information in the local sensitive area database 56. Any suitable software hook may be used. As known in the art, a software hook is a relatively small portion of software code that allows an application (such as DLP agent 52) to detect when a certain mobile operating system command is called and then execute custom code before, during or after execution of that system command. The custom code execute steps that agent 52 wishes to execute every time the system command executes.

For example, if the policy of the enterprise is only concerned with the taking of photographs and storing them on the mobile device, a software hook may only be needed for the storing function of the operating system that stores photographs or video clips when taken. Below are examples of the APIs that are hooked and an example software hook function that obtains the geo-tagging metadata and compares it to the local database.

There are various implementations that support EXIF information retrieval, e.g., C++, Java and C#. Take Windows Mobile as one example. The following function retrieves the EXIF information from photographs:
BitmapMetadata Metadata=(BitmapMetadata)bitmapSource.Metadata The latitude and longitude information is contained in the EXIF metadata. Once we get the location information, the local DLP agent will generate a local DLP signature.

A list of APIs can be hooked to implement our DLP solution. To protect against MMS information leakage the following can be hooked:
HRESULT IMessage::CreateAttach (
  LPCIID lpinterface,
  ULONG ulFlags,
  ULONG FAR*lpulAttachmentNum,
  LPATTACH FAR*lppAttach)
);
HRESULT IMAPIFolder::CreateMessage (
  LPCIID lpinterface,
  ULONG ulFlags,
  LPMESSAGE FAR*lppMessage)
);

In order to protect against File sharing or copying the following can be hooked:
HANDLE CreateFile(
  LPCTSTR lpFileName,
  DWORD dwDesiredAccess,
  DWORD dwShareMode,
  LPSECURITY_ATTRIBUTES lpSecurityAttributes,
  DWORD dwCreationDispostion,
  DWORD dwFlagsAndAttributes,
  HANDLE hTemplateFile)
);
BOOL CopyFile(
  LPCTSTR lpExistingFileName,
  LPCTSTR lpNewFileName,
  BOOL bFailIfExists)
);
BOOL MoveFile(
LPCTSTR lpExistingFileName,
LPCTSTR lpNewFileName);

The hook function would then have the following format:
HANDLE WINAPI hook_CreateFile(LPCTSTR lpFileName, DWORD
dwDesiredAccess,DWORD dwShareMode,
LPSECURITY_ATTRIBUTES lpSecurityAttributes,
DWORD dwCreationDispostion,
DWORD dwFlagsAndAttributes,HANDLE hTemplateFile)
{
  Bool Sensitive_photo=false;
  Location=GetLocation(ImageFile);
  Sensitive_photo=Check_Location_Against_Local_DLP_Signature(Location);
  If (Sensitive_photo)
  (
  Return;

```
    }
    else
    {
        return old_CreateFile(lpFileName, dwDesiredAccess,
            dwShareMode, lpSecurityAttributes, dwCreationDis-
            postion, dwFlagsAndAttributes, hTemplateFile);
    }
}
```

Once the API has been hooked, the DLP agent retrieves the geo-tagging metadata from the image (using, for example the formats EXIF and XMP described above) and is in possession of the latitude and longitude coordinates of where the image was taken. If the DLP agent desires these coordinates in a different format for comparison to the database, then in optional step 320 the DLP agent generates geo-signature information from the latitude and longitude coordinates to place the geo-tagging metadata into a different format. This optional step will be necessary as follows. If the format of the geo-signature information is different from the format stored in the database, it will be necessary to convert. Also, if the format of the geo-signature information is different from the format needed to compare, it will be necessary to convert.

Next, in step 324 the location of the image in question (using its obtained geo-tagging metadata) is compared to all of the sensitive areas found in the local sensitive area database 56. For example, the precise longitude and latitude of the image is compared to any of the sensitive areas shown in FIG. 1 (for example) to determine if the location of the image is found within one of those sensitive areas. One of skill in the art will understand how to compare a longitude and latitude position with a given area to determine if that position falls within the area. One technique to determine if the image location falls within one of the sensitive areas includes the following and is based on the EXIF location information. The DLP policy stored in the sensitive area database defines a rectangle, using the two vertices on the diagonal of the rectangle to define the range. There may be many such rectangles so defined. This pseudo code may be used:

If (Start_latitude<Image.Current.Latitude<End_latitude) and
(Start_Longitude<Image.Current.Longitude<End_longitude)
then determine that the photo is identified as being within the sensitive area.

The DLP agent will iterate the image location against all the DLP sensitive rectangles and then make the final conclusion.

If there is no match in step 328 (i.e., the image location does not fall within one of the sensitive areas), then in step 332 the operation desired to be performed by the mobile device (i.e., store a photograph, transfer an image, etc.) is allowed to occur. But, if there is a match (i.e., the geo-tagging metadata of the image in question indicates that the image was taken within a sensitive area), then the operation desired by the user is blocked in step 324 as per the DLP policy found in database 58. Of course, the DLP policy may not specify that an operation (such as storing a photograph, renaming a photograph, copying a photograph, etc.) be blocked out right, but rather the policy may specify that the operation be allowed but that a warning message be sent back to server computer 12. Or, the policy may specify that an operation such as transferring an image be allowed, as long as the image is being transferred to an electronic destination within corporation (i.e., an e-mail message having the domain name of the corporation). In another embodiment, a photograph may be allowed to be stored on a mobile device money any attempted transfer of the image out of the device will always be blocked. One of skill will appreciate that a given DLP policy may take many different forms and depends to a great deal upon the context, the nature of the corporation and the goal to be achieved by the policy.

When the desired action is blocked from occurring in step 334, the DLP agent may utilize numerous techniques to perform the blocking. For example, the image may not be allowed to be uploaded, copied, transferred, renamed etc. In addition, in step number 334 a warning may be displayed to the user indicating that the desired operation on the sensitive image has been blocked. Further, a violation notice may be sent back from the mobile device to the controller 42 that includes the destination to where the user was attempting to transfer the sensitive image (i.e., web site or IP address, name of removable media, destination e-mail address, location outside enterprise, etc.)

In other situations, it may also be necessary to synchronize the local sensitive area database with the global sensitive area database. The global database includes version information that may be checked by the mobile device each time the device connects or periodically. If the global database has been updated (with new sensitive area information) then a new version will indicate to the mobile device that it must synchronize its local database.

Additionally, when a new photograph or video clip is received on the mobile device (perhaps sent from another mobile device or computer) then DLP agent 52 determines its geo-tagging metadata and compares that position information with all of the sensitive areas in the database 56. In this fashion, a new image transferred to a mobile device is checked against the local database to determine whether this image is sensitive. If so, the DLP policy is applied and steps 324-334 executed.

Computer System Embodiment

Figure 6A:
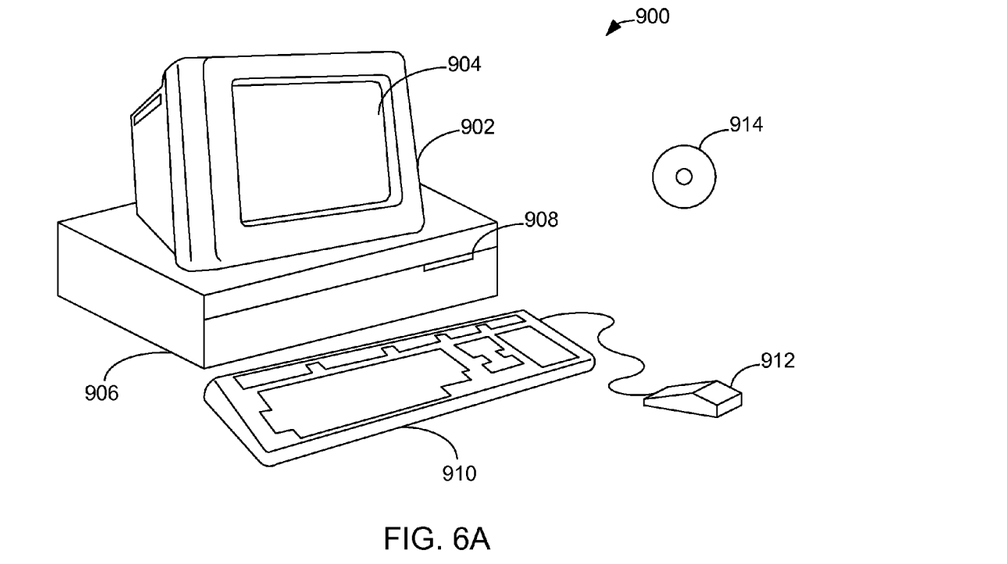
FIGS. 6A and 6B illustrate a computer system suitable for implementing embodiments of the present invention.
Figure 6B:
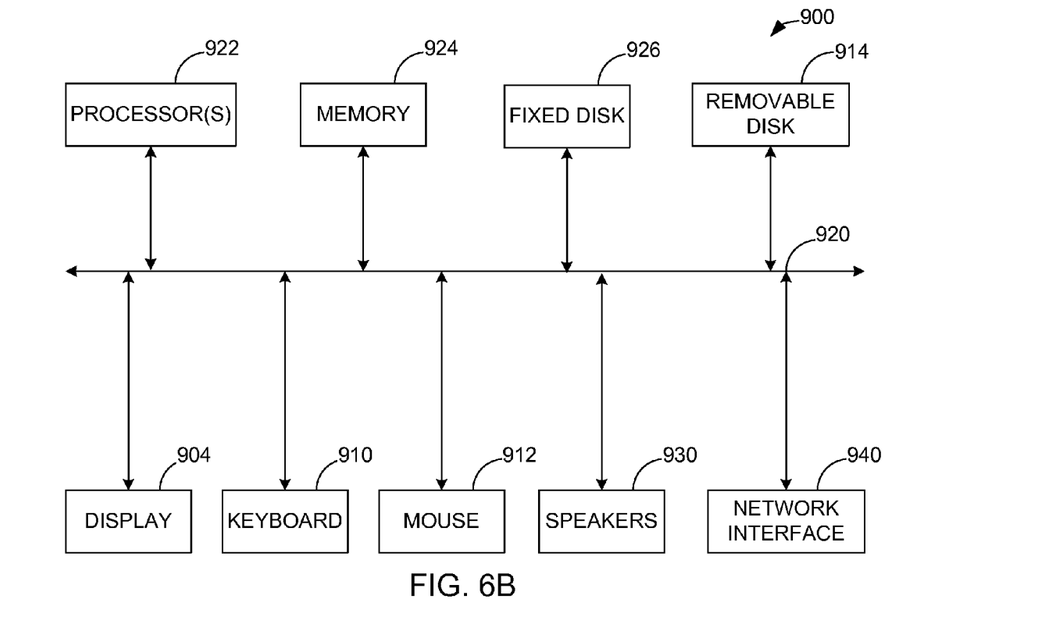

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of enabling a mobile computing device to implement a data loss prevention (DLP) policy of enterprise, said method comprising:
   receiving at a server computer of said enterprise geographical location coordinates that define a sensitive area, wherein said sensitive area specifies that images taken within said sensitive area are deemed as having sensitive data of said enterprise;
   storing said geographical location coordinates in a sensitive area database of said server computer;
   transferring said geographical location coordinates from said server computer to a mobile computing device;
   receiving a rule of said DLP policy at said server computer, said rule requiring an action to be taken when the location of an image falls inside said sensitive area; and
   storing said rule of said DLP policy in a database of said server computer; and
   transferring said rule from said server computer to said mobile computing device, wherein said mobile computing device is obligated to implement said DLP policy of said enterprise.

2. A method as recited in claim 1 wherein said geographical location coordinates include latitude and longitude of a location and a distance from said location.

3. A method as recited in claim 1 wherein said geographical location coordinates include at least three positions each being defined by latitude and longitude values.

4. A method as recited in claim 1 wherein said geographical location coordinates include a range of latitude values and a range of longitude values.

5. A method as recited in claim 1 wherein said action to be taken is blocking the storage of said image or blocking the transferring of said image.

6. A method as recited in claim 1 wherein said image is a photograph, a frame of a video, or a video clip.

7. The method as recited in claim 1 wherein said images are not to be sent to an entity outside the control of said enterprise.

8. A method of enforcing a data loss prevention (DLP) policy of an enterprise on a mobile computing device, said method comprising:
   receiving an indication that a triggering event has occurred on said mobile device, said triggering event including an identification of an image present on said mobile device;
   retrieving geo-tagging metadata from said image, said metadata indicating the geographical location where said image was taken;
   retrieving geographical location coordinates from a database of said mobile device, said coordinates defining a sensitive area, wherein said sensitive area specifies that images taken within said sensitive area are deemed as having sensitive data of said enterprise;
   determining whether said geographical location falls within said sensitive area; and
   taking an action with respect to said image when it is determined that said geographical location falls within sensitive area.

9. A method as recited in claim 8 further comprising:
   retrieving a rule of said DLP policy from a database of said mobile device, wherein said rule dictates that said action be taken.

10. A method as recited in claim 8 wherein taking an action includes blocking the storage of said image on said mobile device or preventing the transferring of said image from said mobile device.

11. A method as recited in claim 8 further comprising:
    hooking an API of an operating system of said mobile device in order to receive said indication that said triggering event has occurred.

12. A method as recited in claim 8 wherein said image is a photograph, a frame of a movie, or a movie.

13. A method as recited in claim 8 further comprising:
    receiving said geographical location coordinates from a server computer under control of said enterprise and storing said coordinates in said database.

14. A method as recited in claim 8 wherein said geographical location coordinates include latitude and longitude of a location and a distance from said location.

15. The method as recited in claim 8 wherein said images are not to be sent to an entity outside the control of said enterprise.

16. A method of enforcing a data loss prevention (DLP) policy of an enterprise on a mobile computing device, said method comprising:
    executing a software hook module on said mobile device to intercept execution of an operation of said mobile device, said operation including an identification of an image present on said mobile device;

retrieving geo-tagging metadata from said image, said metadata indicating the geographical location where said image was taken;

retrieving geographical location coordinates from a database of said mobile device, said coordinates defining a sensitive area, wherein said sensitive area specifies that images taken within said sensitive area are deemed as having sensitive data of said enterprise;

determining whether said geographical location falls within said sensitive area; and blocking said operation on said mobile device from occurring and when it is determined that said geographical location falls within sensitive area.

17. A method as recited in claim 16 wherein blocking said operation includes preventing said image from being stored upon said mobile device.

18. A method as recited in claim 16 wherein blocking said operation includes preventing said image from being transferred from said mobile device.

19. A method as recited in claim 16 further comprising:
downloading said geographical location coordinates from a server computer under control of said enterprise.

20. A method as recited in claim 16 further comprising:
downloading a rule of said DLP policy from a server computer under control of said enterprise; and
storing said rule in a local database of said mobile device, said rule dictating that said operation be blocked.

21. A method as recited in claim 16 further comprising:
reading said geographical location coordinates from said database of said mobile device into a memory of said mobile device.

22. A method as recited in claim 16 further comprising:
reading said rule from said local database of said mobile device into a memory of said mobile device.

23. The method as recited in claim 16 wherein said images are not to be sent to an entity outside the control of said enterprise.

* * * * *